April 4, 1939. C. S. HAZARD Re. 21,041

SIGNAL DEVICE FOR DISPENSING PUMPS

Original Filed March 16, 1936 3 Sheets-Sheet 1

INVENTOR
Charles S. Hazard
BY
Mozart, Mears, Campbell
his ATTORNEYS

SIGNAL DEVICE FOR DISPENSING PUMPS

Original Filed March 16, 1936 3 Sheets-Sheet 2

INVENTOR
Charles S. Hazard
BY
Hoguet, Newy & Campbell
his ATTORNEYS

SIGNAL DEVICE FOR DISPENSING PUMPS

Original Filed March 16, 1936 3 Sheets-Sheet 3

INVENTOR
Charles S. Hazard
BY
Hoyne, Meany & Campbell
Lis ATTORNEYS

Reissued Apr. 4, 1939

Re. 21,041

UNITED STATES PATENT OFFICE 21,041

SIGNAL DEVICE FOR DISPENSING PUMPS

Charles S. Hazard, Andover, N. J., assignor to Neptune Meter Company, a corporation of New Jersey Original No. 2,061,538, dated November 17, 1936, Serial No. 69,059, March 16, 1936. Application for reissue June 27, 1938, Serial No. 216,190

13 Claims. (Cl. 221—95)

This invention is directed to a warning signal interconnected with an indicating register on a liquid dispensing pump for informing customers whether or not the indicator was at zero position at the beginning of a dispensing operation.

Dispensing pumps are known in which a means for controlling the flow of the liquid is interconnected with a means for resetting the indicating register to zero position. One type of device is provided with switch connections for starting or stopping the pump, either simultaneously with the return of the indicator to zero position, or after the indicator has been returned to zero. Devices of this type are shown in the U. S. Patent Nos. 1,970,361 and 1,953,598.

Another type of dispensing pump is provided with a valve in the liquid conduit which upon actuation by a manually controlled device either permits the liquid to flow through the dispensing hose or prevents it from doing so, depending upon whether or not the indicator has been reset to zero. This type of interlocking dispensing device is shown in the U. S. Patent No. 2,022,932.

The present invention is directed to a dispensing device in which the pump motor is controlled by a movable hook upon which the hose is supported, the operation of the motor being entirely independent of the position of the indicator at the beginning of a dispensing operation. In order to insure that the pump will be so operated as to give an accurate indication of the amount of liquid dispensed, the pump is provided with a warning signal device which informs the customer as to the condition of the indicator at the beginning of a dispensing operation.

More specifically, the warning signal is interconnected with a manually actuated device which upon actuation resets the indicator to zero position and releases the signal device for movement into such a position that a designation will appear in the indicator dial showing that the indicator has been reset to zero. If the indicator is not reset to zero, the signal device is capable of movement through a different distance, at the end of which movement the device is stopped, thereby moving the signal into such a position that a designation showing that the indicator has not been reset to zero will appear on the indicator dial.

The specific means for limiting the movement of the warning signal preferably consists of a control member which is displaceable only after the indicator is at zero position. The operation of the control member is entirely dependent upon the positive engagement of stop means on the indicator so that the control member cannot be displaced until the indicator is positively located at zero position.

It will thus be understood that the purpose of this invention is to inform the customer as to whether or not the indicated amount of liquid has actually been dispensed, thereby causing the operator of the dispensing device to reset the indicator prior to every dispensing operation to avoid the loss of patronage through argument with customers.

The present invention has the further desirable feature that if the customer desires to obtain an additional quantity of liquid after a dispensing operation has been completed and the dispensing hose has been returned to the hose hook stopping the motor; the removal of the hose from the hook will again start the motor and pump to dispense an additional quantity of liquid and the two quantities of fluid will be totalized on the indicator, the signal being of a character to warn the attendant and customer of the fact that the indicator has not been reset but which at the same time permits accurate reading of the quantities dispensed.

With this explanation in mind, reference is made to the accompanying drawings in which.

Figure 1:
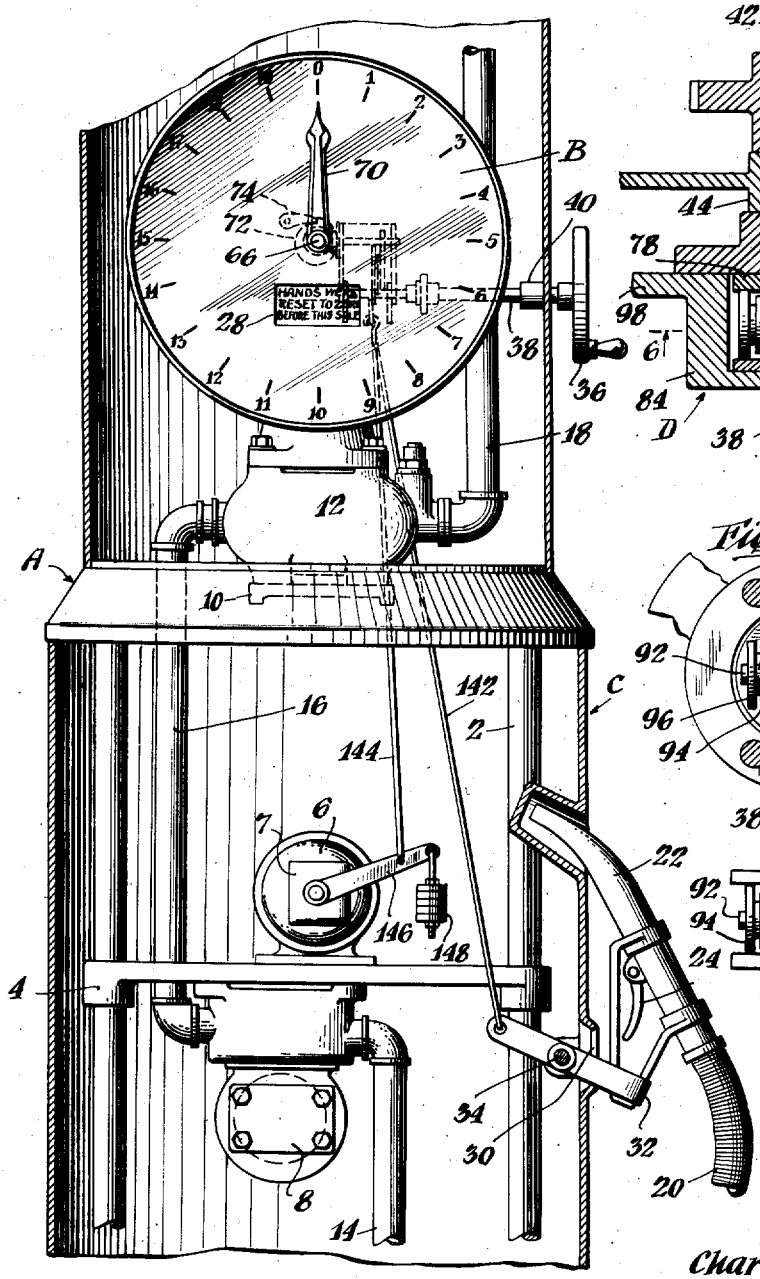
Figure 1 is an elevation of the dispensing device with a portion of the housing removed.

The dispensing device indicated generally as A in Figure 1 includes uprights 2 for supporting various elements. A cross member 4 carries the motor 6, provided with a switch 7, for driving a pump 8 to pump the liquid from a source of supply (not shown). Supported on upper cross member 10 is a meter 12 of any desired type. A conduit 14 connects the inlet side of the pump 8 to the source of liquid supply. A second conduit 16 leads from the outlet of the pump to the meter 12; and a third section of the conduit 18 leads from the outlet of the meter to a dispensing hose 20 having a nozzle 22. The nozzle 22 has a hand controlled valve 24 thereon of any well known type.

Connected to the meter 12, through gearing and a friction clutch (not shown) is an indicator provided with an aperture 28, the purpose of which will be later described. It will be understood that any conventional type of gearing may be provided between the meter and the indicator hands, and that two hands may be provided for indicating the number of gallons and fractions of gallons of fluid dispensed, these elements forming no part of the present invention. The purpose of the clutch between the indicator and the meter is to permit rotation of the indicator hands to zero position without necessitating the nutation of the disk in the meter, or turning the gears between the meter and the indicator.

In one wall of the housing C for the device is an aperture 30 through which projects a support 32 for the hose nozzle 22 pivoted at 34. A hand crank 36 on shaft 38 is journalled in bearing 40 in the housing C. In alignment with the shaft 38 and connected for movement therewith and also relatively thereto, as hereinafter explained, is another shaft 42 journalled in bearings 44 and 46 in journal plates 45 and 47, supported in any desired manner in the housing. Pinned to shaft 42 for rotation therewith is pinion 48 (Figures 2, 3 and 5) meshing with gear 50 to turn gears 50, 52 and 54 upon rotation of shaft 42. Gears 50, 52 and 54 are supported for rotation on lever 56 which is loosely supported on shaft 42 for free movement thereabout.

Figure 2:
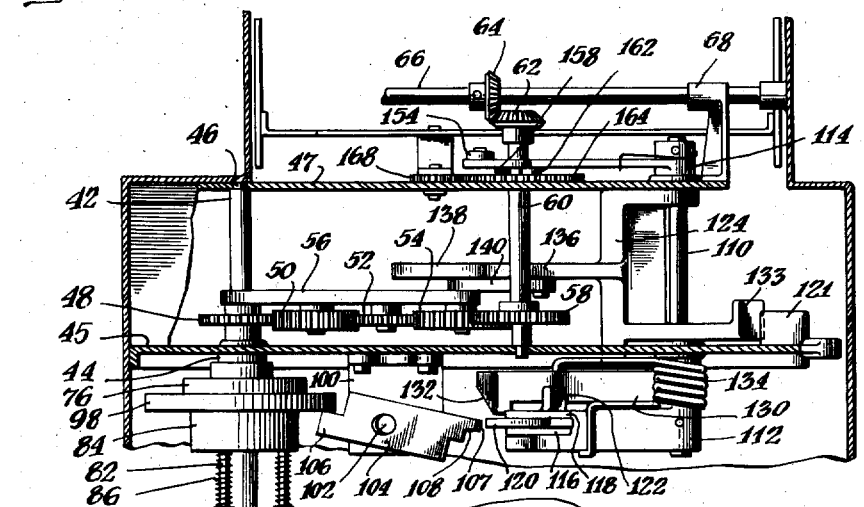
Figure 2 is a plan view partially broken away of a detail of the resetting mechanism for the indicator and the interlocking controls for the signal device.

The end gear 54 of a train of gears is arranged to engage with a pinion 58 pinned to shaft 60 journalled in bearings in journal plates 45 and 47 (as shown in Figure 2). At the outer end of shaft 60 is a bevel gear 62 engaging a similar bevel gear 64 which is in turn pinned to shaft 66 for rotation therewith. Shaft 66 is journalled in bearings 68 in the housing C and drives a gear train mechanism (not shown) for operating two hands on the indicator for indicating whole and partial gallons of fluid dispensed. For purposes of illustration, however, it will be assumed that a shaft 66 is directly connected to the hands 70. To shaft 66 is also connected the gearing (not shown) from the meter 12 and shaft 66 is rotated thereby to register the quantity of fluid passing through the meter. As shown in Figure 1 the shaft 66 also carries a single tooth cam 72, which upon rotation in a counterclockwise direction is engageable with a pawl 74 mounted on the housing or the back of the indicator dial to stop the indicator hand at zero position on the dial. Assuming that gear 54 is engaged with pinion 58, rotation of the crank 36 will cause rotation of shaft 42, shaft 60, shaft 66, and will return the hands 70 in a counterclockwise direction to zero position where the pawl 74 will engage the tooth of cam 72 and stop rotation of the shafts 66, 60 and 42.

Figure 5:
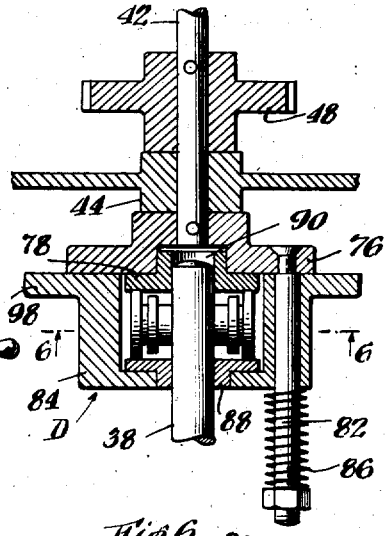
Figure 5 is a sectional view of the lost motion connection between the resetting crank shaft and the shaft for resetting the indicator.
Figure 6:
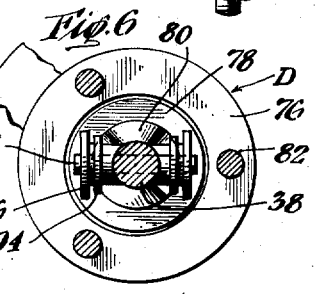
Figure 6 is a sectional view of the lost motion connection taken on line 6—6 of Figure 5.
Figure 7:
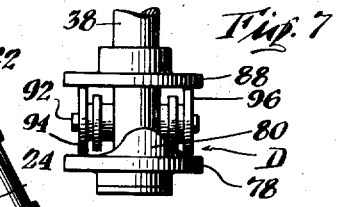
Figure 7 is a view in elevation of the lost motion connection with the housing removed.

As previously mentioned, shafts 38 and 42 are relatively movable through the mechanism disclosed in Figures 5, 6 and 7 and indicated generally as D. As shown in Figure 5, the mechanism D consists of a recessed disk 76 pinned to shaft 42 for rotation therewith. Supported in the recess of the disk and secured thereto is a cam member 78, having diametrically spaced lobes 80. Attached to the recessed disk 76 by stud bolts 82 is a housing member 84 which is shiftable away from the disk 76 against the compression of springs 86. Supported rigidly in the housing 84 is a bearing plate 88, through which shaft 38 projects and is rotatable with the relation thereto. Passing diametrically through the shaft 38 is a pin 92 carrying at each end a set of independently rotatable rollers 94 and 96, roller 96 being of greater diameter than 94, as best shown in Figure 6. The roller 94 engages the cam lobes 80 when the shaft 38 is rotated relatively to shaft 42, the rollers riding upon the cam and displacing the housing 84 axially of the shaft 38, with rollers 96 bearing against the plate 88. Thus when the indicator is stopped at zero position by engagement of pawl 74 and cam 72, the shaft 42 is also stopped as previously indicated, and a further rotation of shaft 38 by crank 36, causes an axial displacement of housing 84, against the compression of springs 86.

Supported on a bracket 100 by a pivot pin 102, is a control member 104 having a projection 106, extending across the flange 98 and adapted to be rocked in a counterclockwise direction as viewed in Figure 2, by displacement of housing 84. At the opposite end of the control member 104 is a projection 107, having along one lateral edge an inclined surface 108 for a purpose later to be described.

Figure 3:
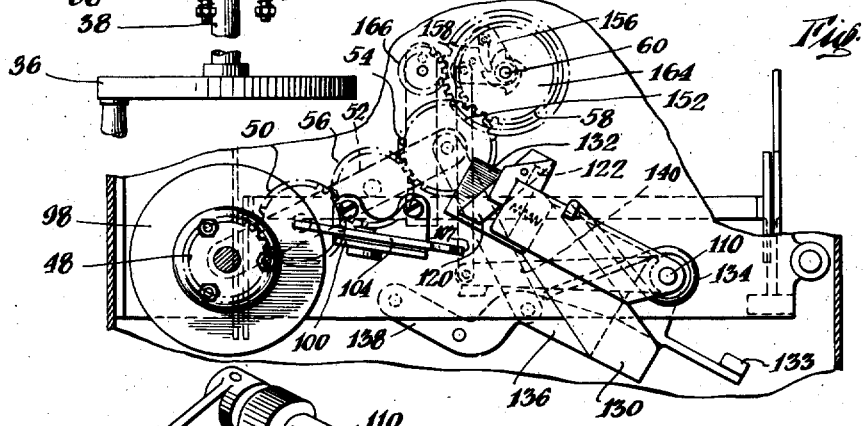
Figure 3 is a view in elevation of the resetting mechanism for the indicator and the interlocking controls for the signal device; also partially broken away.
Figure 4:
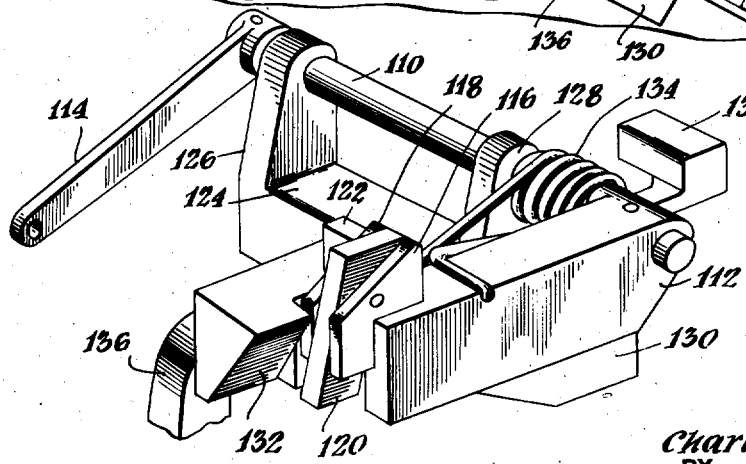
Figure 4 is a perspective view of a detail of the latch lever and the cam lever.

Journalled in plates 45 and 47 is a shaft 110, as shown in Figures 2, 3, and 4, having pinned thereto at opposite ends a latch lever 112 and a signal actuating lever 114. The latch lever 112 carries at its free end a pair of spaced lug members 116, 118 between which is pivotally supported latch 120 which normally overlies, but does not engage the projection 107 on the control member 104, as shown in the full lines in Figures 3 and 8. Projecting from a lateral edge of the latch lever 112, is a stop lug 122 for a purpose to be described.

Loosely supported on shaft 110 is a yoke member 124 having arms 126 and 128 through which passes the shaft 110. Attached to the yoke member 124 is a lever 130 which is shown as being integral with the yoke member. At the outer end of lever 130 is an inclined cam surface 132 which is engageable with an edge of the projection 107 when the control member 104 is in a displaced condition. Upon movement of the lever 130 in a counterclockwise direction, the control member 104 is returned from a displaced position clockwise to the position shown in Figure 2. The yoke 124 is also provided with a stop arm 133 which projects in the opposite direction from the lever 130 and which is engageable with a portion of the housing to limit the movement of the lever to the lowermost position indicated in broken lines in Figure 8. Connecting the lever 112 for movement with lever 130 is torsion spring 134 which tends to hold stop lug 122 against the lever 130. Also connected to yoke 124 is a lever 136 having an offset portion 138. Pivotally connected to lever 136 is one end of a link 140, the other end of which is pivotally connected to lever 56 for moving the gear 54 into and out of engagement with pinion 58 on shaft 60, as levers 136 and 130 are moved up and down around shaft 110. Connecting the inner end of the hose-support and offset 138 of lever 136 is a link 142, a second link 144 connects lever 136 through offset portion 138 to the motor switch 7, through arm 146. A weight 148 is provided on arm 146 for moving the lever 136, 138 downwardly and for throwing the switch 7 into "on" position to start the motor and pump. The weight of the hose 20 and nozzle 22 is sufficient to move the switch arm 146 with weight 148; link 144, levers 130 and 136, 138 to "off" position to stop the motor and pump, and to engage gear 54 with pinion 58.

Thus when the hose is removed from the hook, the weight 148 pulls switch arm 146 down to "on" position, rotates the lever 138, 136 in a counterclockwise direction to disconnect gear 54 from pinion 58, move lever 130 downwardly and through torsion spring 134, pull latch lever 112 down to engage the latch 120 with projection 107 on the control member, and also move lever 114 downwardly.

Figure 8:
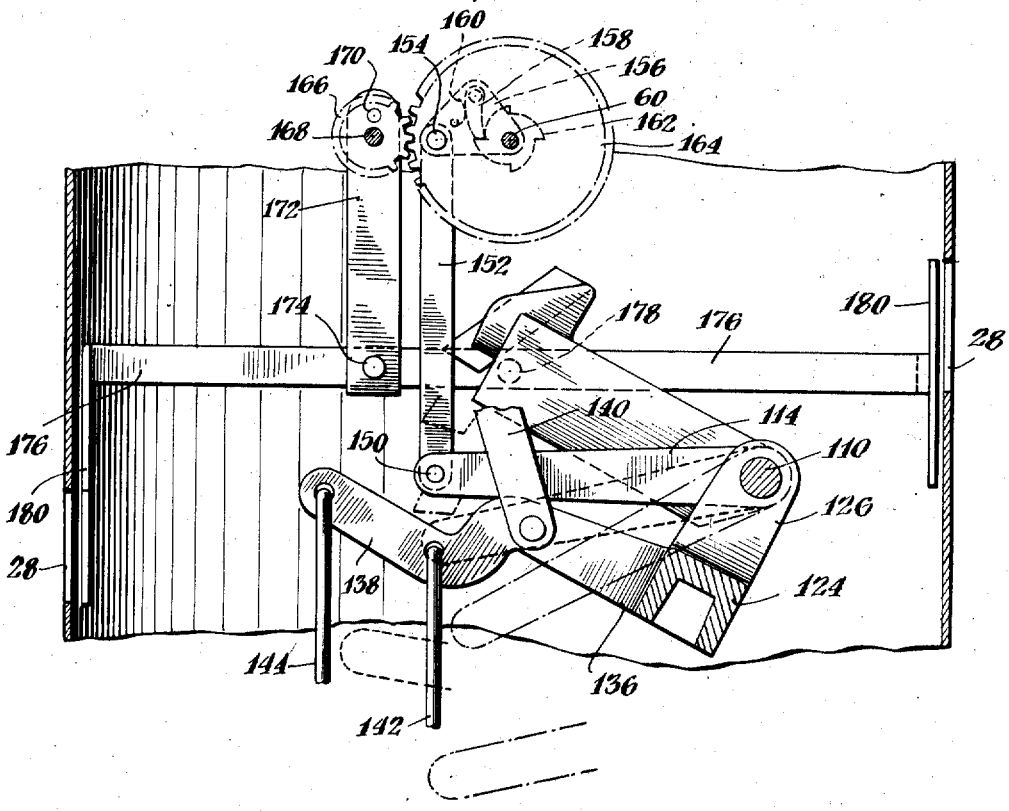
Figure 8 is a view in elevation of a detail of the signal operating means with the latch lever shown diagrammatically in three positions.
Figure 9:
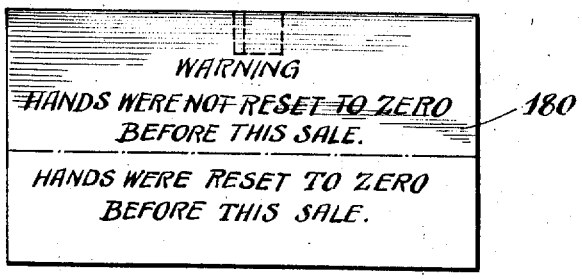
Figure 9 is a view in elevation of the signal plate carrying the designations.

Connected to the free end of lever 114 by pivot 150 is one end of a link 152, the opposite end of which is connected by pivot 154 to a pawl carrying member 156 having pawl 158 pivoted thereon. Pawl 158 is biased in a counterclockwise direction by spring 160. The pawl carrying member 156 is supported for oscillatory movement on shaft 60, and the pawl engages with a four toothed ratchet 162, integral with or rigidly attached to gear 164, also loosely rotatable on shaft 60. Meshing with gear 164 is a pinion 166, rotatably mounted on stud shaft 168 supported on plate member 47. The gear 164 and pinion 166 are so proportioned that one revolution of gear 164 causes four revolutions of pinion 166. Projecting from the pinion 166 is a crank pin 170, engaging in an arm 172 on the signalling device. Arm 172 is pivotally connected at 174 to the signal carrying arm 176 which is in turn pivotally supported at 178 for oscillatory movement as the crank pin 170 is rotated. Attached to the opposite ends of signal carrying arm 176 are signal members 180 which are approximately twice as wide as the vertical width of the aperture 28 in the signal dial and fall directly behind the aperture. As shown in Figure 9, the upper half of the signal member intended to be moved up and down with respect to the dial aperture 28 on the left side of the dispensing device, as viewed in Figure 8, is provided with a designation indicating that the indicator has not been reset to zero position and the lower half of the signal member is provided with the designation indicating that the indicator has been reset to zero. The signal member at the right side of the dispensing device has the location of the designations reversed. With this arrangement, the designations exposed through opposite dial apertures will be the same, no matter what the position of arm 176 may be.

The operation of the device is as follows: Assuming that a dispensing operation has been completed and the dispensing hose has been returned to the movable hose support 32, and that a 10 gallon quantity of fluid has been delivered in the dispensing operation; the indicator will then read 10 gallons, the motor will be stopped and the control member projection 107 will be located under the latch 120 on latch lever 112 with the latter in its highest position as shown in Figures 3 and 8.

To dispense another quantity of fluid, the hose is removed from the hook 32 permitting it to swing upwardly, thereby closing the switch, starting the motor and pump, moving the gear 54 out of engagement with pinion 58 on the shaft 60, and moving latch lever 112 and lever 130 downwardly. Latch 120 engages the projection 107 on the control member 104, thus moving only approximately one-half of the distance through which it is capable of moving (see Figure 8). Lever 114 also moves through a corresponding arc and the pawl 158 moved by link 152 engages the ratchet 162, turning gear 164 through one-eighth of a revolution. The ratio between gear 164 and pinion 166, being 1 to 4, pinion 166 is rotated through 180°, thereby moving the crank pin 170 into its lowest possible position or 180° from the position disclosed in Figure 8. This displaces lever 172 downwardly, rocking signal carrying arm 176 counterclockwise, and exposing through the aperture in the indicator the designation warning the customer that the indicator has not been reset to zero. If the valve 24 in the dispensing nozzle 22 is then opened to dispense the fluid, the warning signal will remain in the indicator aperture, informing the customer that the final amount of the reading on the indicator dial is inaccurate.

Assuming the same situation to exist as that set forth in the first paragraph of the description of the operation of the device; to cause the signal to indicate that the indicator has been reset to zero, the resetting crank 36 is turned to cause the indicator to return counterclockwise to zero position through the rotation of shafts 38, 42 the train of gears, 48, 50, 52, 54 and 58, shaft 60, gears 62 and 64 and shaft 66. The indicator shaft 66 turns until stop means 72 and 74 engage, thereby preventing further rotation of shaft 66, gears 48, 50, 52, 54 and 58, shaft 42, and cam surface 78, 80. Further rotation of crank 36 causes rotation of shaft 38 and rollers 94, 96 relatively to cam lobes 80, the rollers 94 riding up on the lobes 80 of the cam 78 displacing the housing 84 axially of shaft 38, and swinging the projection 107 on control member 104 from beneath the latch 120. Upon removal of the dispensing hose from the hose hook, the motor is started, and the gear 54 disengaged from pinion 58, thereby leaving indicator shaft 66 free to be rotated by the meter. The latch lever 112 is swung downwardly with levers 130 and 136 to its lowermost position through the tension of spring 134, as shown in dotted lines in Figure 8.

As cam lever 130 moves downwardly the cam surface 132 engages an edge of projection 107 on the control member 104 turning the latter clockwise, as viewed in Figure 2. The cam surface 108 engages latch 120, tilting it back so that the projection 107 may pass thereabove as the latch moves downwardly. Lever 114, moving with latch lever 112, causes pawl 158 to rotate ratchet 162 and gear 164 through one-fourth of a revolution, thereby turning the gear 166 and crank pin 170 through 360°, and oscillating signal support arm 176, but finally returning the arm and signal to the position shown in Figure 8, whereby the designation indicating that the indicator has been reset to zero position is exposed through the aperture in the indicator dial. The hand valve on the nozzle is then opened to dispense the fluid, the quantity of fluid being registered on the indicator.

A dispensing operation having been completed, the replacement of the hose upon the support 32 causes link 142 to force lever 138, 136 upwardly, moving cam lever 130 upwardly against stop lug 122, and moving lever 114 and latch lever 112 upwardly in a clockwise direction. The link 144 lifts switch arm 146 to "off" position, thereby stopping the motor. As the lever 130 reaches its highest position, the lever 136, 138, acting through link 140, causes the gear 54 to engage the pinion 58 thereby placing the device in a condition to be reset to zero.

It will be understood from the foregoing description that a device has been provided which necessitates a positive sequence of operations prior to a dispensing operation to insure that the quantity of fluid dispensed is registered accurately on the indicators of the pump in order that the customer may be satisfied that no improper operation of the pump has occurred. It will also be apparent that while the signal operates to warn the attendant and customer whenever a dispensing operation is attempted without first resetting the indicator to zero position, the indicator is adapted to totalize accurately the quantities dispensed in a plurality of dispensing operations so that after completion of a dispensing operation, an additional quantity may be delivered at the request of the customer without having to take the time usually necessary to reset the indicator.

It will be evident that there may be many variations in the specific manner of actuating the signal, falling within the range of mechanical equivalents of the structure disclosed; that there may be many variations in the usage to which the signal device and the dispensing apparatus, as a whole, may be put, all falling within the scope of the invention, as defined in the following claims.

I claim:

1. In a warning signal for dispensing pumps, a member having two designations thereon, each of which is individually exposable to view, a movable arm carrying said member, a latch lever operatively connected to said arm for moving the member, and control means movable to two positions, in one of which the latch lever is engageable with the control means and in the other the latch member passes beyond the control means, to thereby expose the designation corresponding to the position of the control means.

2. In a warning signal for dispensing pumps, a member having two designations thereon, each of which is individually exposable, a movable arm supporting the said member, means including a pawl and ratchet for moving said arm, a lever carrying said pawl, a latch lever connected to the pawl carrying lever for movement therewith, and control means movable to two positions, in one of which the latch lever engages the control means and in the other the latch member passes beyond the control means, to thereby expose the designation corresponding to the position of the control means.

3. In a warning signal for dispensing pumps, a control member movable to a plurality of positions, a pivoted latch lever engageable with the control member in one position of the latter, and free of the control lever in another position of the latter, a second lever connected to and movable with the latch lever, a signal device including a member having a plurality of individually exposable designations thereon, and means connecting the second lever to the signal device member for moving the latter to expose the designation corresponding to the position of the control member.

4. In a warning signal for dispensing pumps, a control member movable to a plurality of positions, a pivoted latch lever engageable with the control member in one position of the latter, and free of the control lever in another position of the latter, a second lever connected to and movable with the latch lever, a signal device including a member having a plurality of individually exposable designations thereon, and means including a pawl and ratchet and a crank for connecting the second lever to the signal device member for moving the latter to expose the designation corresponding to the position of the control member.

5. A dispensing pump having a housing, an indicator on the housing, means for resetting the indicator to a predetermined position, an aperture in the housing, a signal device including a member having two designations thereon, one of which indicates that the indicator has been reset to the predetermined position and the other indicates that the indicator has not been reset to the predetermined position, and means connected to the resetting means for moving the member to expose through the aperture one of said designations corresponding to the position of the indicator.

6. A dispensing device, comprising a housing having an aperture therein, fluid flow producing means, a pivoted hose hook connected to said means for controlling the fluid flow, an indicator on the housing, means for resetting the indicator to a predetermined position, a signal device including a member having two designations thereon, one indicating that the indicator has been reset to the predetermined position, and the other indicating that the indicator has not been reset to the predetermined position, and means operatively connected to the signal device, the resetting means and the hose hook, for exposing through the aperture only the designation corresponding to the position of the indicator.

7. In combination with a dispensing device having an indicator and means for resetting the indicator to zero; means displaceable from one position to another position by the resetting means after the indicator has been reset to zero, a pivotally supported latch lever engageable with the displaceable means in said one position and movable to said another position, a second lever connected to and movable with the latch lever operatively connected to a signal means for moving the latter to one of two positions to indicate that the indicator has or has not been reset to zero.

8. In a fluid dispensing device, an indicator for registering the quantity of fluid dispensed, means for resetting the indicator to zero, a control member displaceable by the resetting means when the indicator has been reset to zero, a movable signal having actuating means movable into engagement with the control member prior to displacement of the latter and movable beyond the control member after the latter has been displaced.

9. In a fluid dispensing device, the combination of a fluid pump, a meter for measuring the quantity of fluid pumped, an indicator connected to the meter for registering the quantity of fluid pumped, movable means for resetting the indicator to initial position, means connected to the resetting means displaceable by movement of the resetting means after the indicator has been returned to neutral position, a control member engageable with the displaceable means and movable upon displacement of the latter, a signal device including a pivotally supported arm, rotary crank means for swinging the arm, a ratchet-driven gear for rotating the crank, a pivoted lever connected to a pawl engaging with the ratchet, a latch lever movable with the pivoted lever and engageable with the control member in one position of the latter and movable beyond the control member when it has been displaced, and a third lever connected to the latch lever for starting and stopping the pump.

10. In a fluid dispensing device, the combination of a fluid pump, means for actuating the pump, a meter for measuring the quantity of fluid dispensed, indicating means for registering the quantity of fluid dispensed, movable means for resetting the indicator to zero, means connected to the resetting means, displaceable by movement of the resetting means after the indicator has been reset to zero, a control member engageable with the displaceable means, and movable upon displacement of the latter, a movable signal device including a pivotally mounted arm, a latch lever operatively connected to the pivotally mounted arm for movement therewith engageable with the control member in one position of the latter, but movable beyond the latter upon displacement thereof by the resetting means, another lever flexibly connected to the latch lever but capable of movement relatively thereto, said another lever being connected to the pump actuating means for moving the latch lever into engagement with or beyond the control member.

11. In a dispensing device, the combination of means for dispensing fluid, means for starting and stopping the dispensing means, an indicator for registering the quantity of fluid dispensed, means for resetting the indicator to a predetermined position, a signal device movable to two positions for exposing designations indicating whether or not the indicator has been reset to the predetermined position, a latch member operatively connected to the signal device and resiliently connected to the means for starting and stopping the dispensing means for movement with and relatively to the latter for exposing the designation corresponding to the condition of the indicator with regard to its relation to the predetermined position.

12. In a liquid dispensing device, the combination of an indicator movable away from an initial position in proportion to the quantity of liquid dispensed, means for resetting the indicator to initial position, means for initiating a dispensing operation, and signalling means operatively connected to said indicating means and said resetting means to signal when the indicator has not been reset to said initial position prior to the initiation of a dispensing operation, said signalling means being clear of readings indicated by said indicator.

13. In a liquid dispensing device, the combination of an indicator movable away from an initial position in proportion to the quantity of liquid dispensed, means for resetting the indicator to initial position, means for initiating a dispensing operation, and signalling means operatively connected to said initiating means and said resetting means to signal when the indicator is away from zero position upon the initiation of a dispensing operation, said indicator being adapted, however, to indicate the total quantity dispensed in a plurality of dispensing operations despite the operation of said signal.

CHARLES S. HAZARD.